United States Patent

[11] 3,593,907

| [72] | Inventor | Siegfried Hahne<br>Rheinkamp-Baerl, Germany |
|---|---|---|
| [21] | Appl. No. | 744,524 |
| [22] | Filed | July 12, 1968 |
| [45] | Patented | July 20, 1971 |
| [73] | Assignee | Messer Griesheim G.m.b.H.<br>Frankfurt am Main, Germany |
| [32] | Priority | July 19, 1967 |
| [33] | | Germany |
| [31] | | P 16 27 555.1 |

[54] DEVICE FOR WELDING BAND ENDS
8 Claims, 10 Drawing Figs.

[52] U.S. Cl. ............................................. 228/4,
29/464, 228/8, 228/44
[51] Int. Cl. .............................................. B23k 1/20
[50] Field of Search ........................................ 228/4, 5, 8,
44, 47; 29/464, 493; 250/219

[56] References Cited
UNITED STATES PATENTS

| 3,394,857 | 7/1968 | Wheeler et al. | 228/5 |
| 3,421,676 | 1/1969 | Jenkins | 228/44 X |
| 3,458,103 | 7/1969 | Davis | 228/5 |
| 3,510,045 | 5/1970 | Petros | 228/5 |
| 3,378,185 | 4/1968 | Wheeler et al. | 228/5 |
| 3,355,079 | 11/1967 | Ellis | 228/47 |

*Primary Examiner*—John F. Campbell
*Assistant Examiner*—Robert J. Craig
*Attorney*—Connolly and Hutz

ABSTRACT: A device for welding band ends together includes a shear at the upper crossbeam of its frame to trim the band ends and a lower crossbeam which is constructed to function as the bearing surface area for the welding pool.

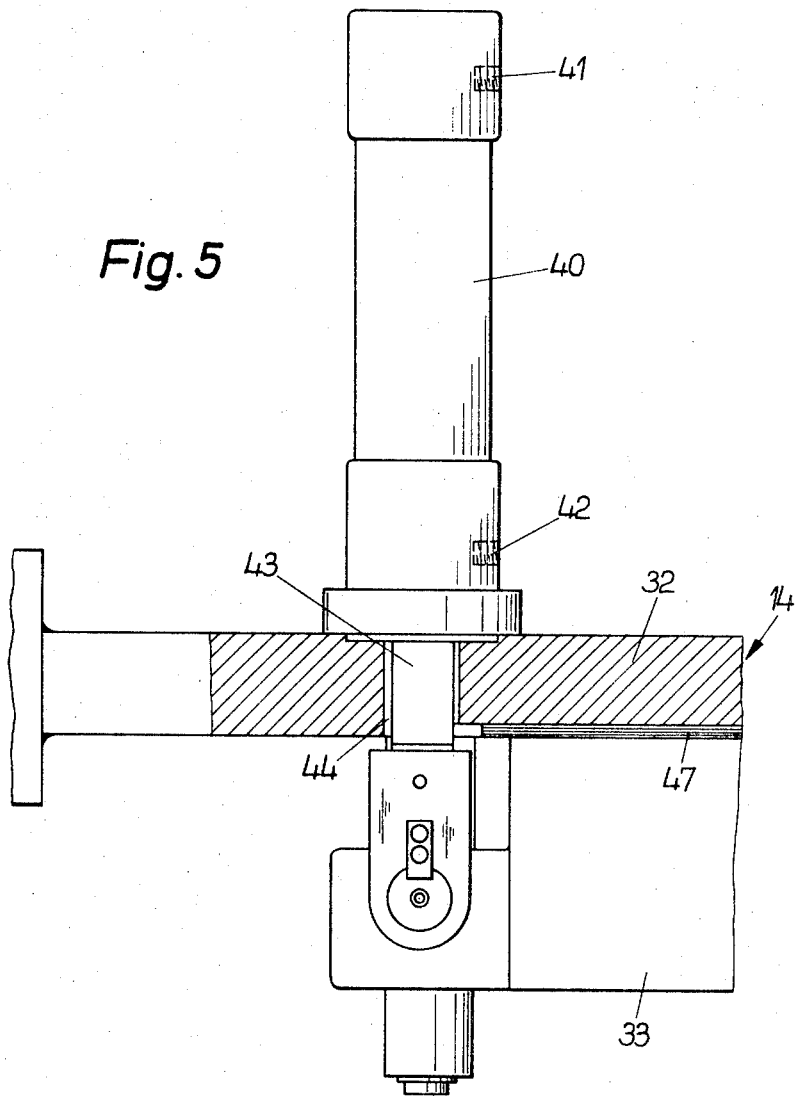

3,593,907

DEVICE FOR WELDING BAND ENDS

BACKGROUND OF INVENTION

This invention relates in general to the type of device described in German Pat. No. 1,216,073. The advantages of this known device consist essentially in that by means of two separating shears a satisfactory formation of the cutting edges is achieved. Thus, for example with respect to both cutting edges, a shearing is achieved on the upper side increasing downwards. This type of shearing permits a very advantageous welding seam to be formed with V-shaped welding edge preparation, which in turn is an added advantage particularly for thick sheet metals to be welded with additional wire. But even for transformer metal sheets of about 0.3 mm. thickness, the device according to the German Pat. No. 1,216,073 offers considerable advantages, since with respect to these metal sheets an airgap of only 0.1 mm. between the cut bands makes a welding together impossible.

After the trimming of the band ends, according to the above patent, the shearing cutter holder is lowered under the plane in which the bands are located for welding. Subsequent to the lowering of the shearing cutter holder, the upper part of the holder then serves as the bearing surface area for the welding puddle and at the same time serves for the firm clamping of the band ends during the welding process.

The undisputable advantages of the above described double function of the shearing cutter holder, however, are counteracted by the disadvantage that a repetition of the separating cut after an initial carrying out of the same and subsequent welding of the band ends is impossible, since the shearing cutters are located below the now sealed band. Such a repetition of the separating process, however, is necessary under certain circumstances, for example with respect to a nonmethodical welding of the band ends.

SUMMARY OF INVENTION

The object of this invention is to provide a device of the above type, whereby the separating process is repeated as often as desirable without having to remove the band from the equipment in advance. For the solution of the problem it is essentially proposed according to the invention that the holder have a frame-shaped construction and that the upper crossbeam carries the shearing cutter with the inner side of the lower crossbeam being constructed as the bearing surface area for the welding pool.

After the separating process, the separating tools are immediately returned to their starting position so that the separating process—even after the welding of the band ends—is repeated as often as desired. The inner side of the lower crossbeam formed as the welding base can of course serve at the same time for the firm clamping of the band ends to be welded—just as in the German Pat. No. 1,216,073.

The indisputable advantages of the known arrangement are thereby maintained, with the added advantage of the ability with the progressiveness of the invention to repeat at will the separation process. A further point wherein the inventive device is decidedly superior to the known one consists in the fact that the upper crossbeam, preferably the upper side thereof, at the same time serves for the suspension of the conveyable welding torch.

It is recommended, for example, to attach—at the upper side of the upper crossbeam—a rack for engaging the driving pinion of the torch drive. In this connection, the driving motor which is conveyable with the welding torch is suitably arranged above the crossbeam, while the welding torch per se— if necessary vertically adjustable—is attached at the carrying members laterally clasping the upper crossbeams.

By means of the inventive suspension of the welding torch at the shearing cutter holder, on the one hand a separate torch mounting becomes superfluous and on the other hand the maintenance of the once set distance of torch to welding surface is always guaranteed, since these two parts are firmly connected together by means of the shearing cutter holder.

THE DRAWINGS

FIG. 1 is a band-welding equipment in cross section;
FIG. 2 is a cross section in the direction of arrow A in FIG. 1;
FIG. 3 is a top view of the band-welding equipment according to FIGS. 1 and 2;
FIG. 4 is a sectional view of a clamp and separating device of the band-welding equipment according to FIGS. 1 to 3 on an enlarged scale;
FIG. 5 is a section along line V-V in FIG. 4;
FIG. 6 is the basic position of the band-welding equipment in the passage of the bands (shown schematically);
FIG. 7 is the basic position of the band-welding equipment after the clamping of the band ends (shown schematically);
FIG. 8 is the basic position of the band-welding equipment after the trimming of the band ends (shown schematically);
FIG. 9 is the basic position of the band-welding equipment prior to the coming together of the trimmed band ends (shown schematically); and
FIG. 10 is the welding position of the band-welding equipment, also shown in schematic form.

DETAILED DESCRIPTION

As particularly shown in FIGS. 1 and 2, the entire band-welding equipment is mounted on rolled section-supporting members 10, which are arranged somewhat below the floor level, characterized by a thin line 11.

The main parts of the band-welding equipment include separating devices 12, 13, two pairs of clamping jaws 14 (see particularly FIGS. 4 and 5) as well as the actual welding arrangement. The welding arrangement which is not shown can be of any desired construction, such as an electric arc protective gas-welding arrangement with or without filler material or also as an autogenous welding arrangement.

Figure 4:
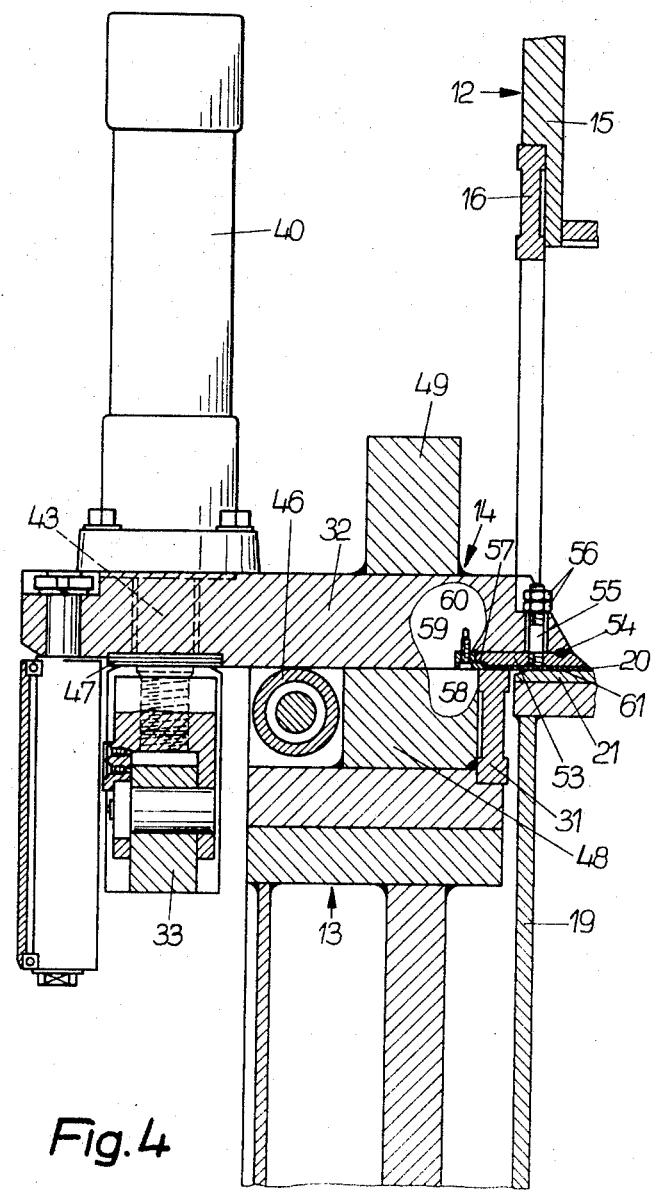

The movable part of the separating device is designated with 12. It consists of a vertically moving frame-shaped holder having an upper beam 15 at both sides of which shearing cutters 16 are arranged. The stationery part 13 of the separating device, particularly shown by FIG. 4, is also provided with two shearing cutters 31.

Figure 1:
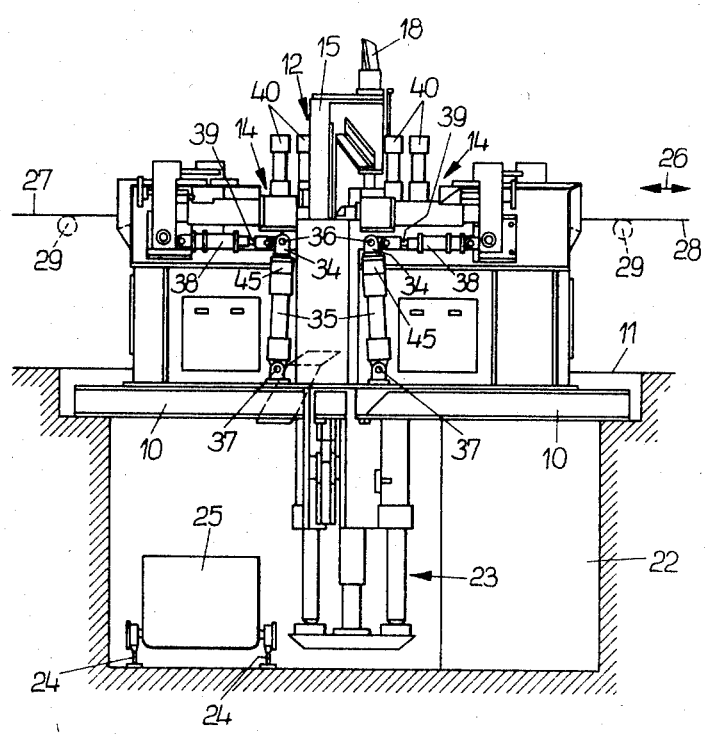
Figure 2:
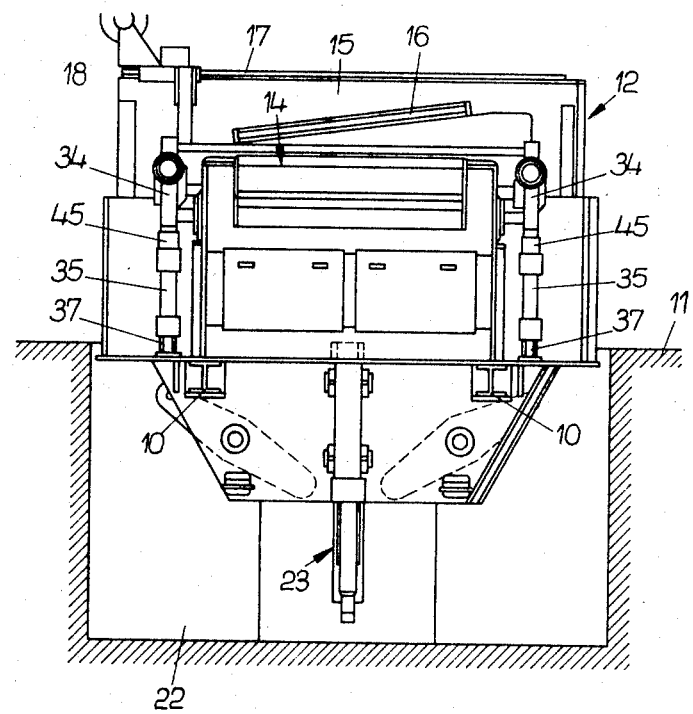
Figure 3:
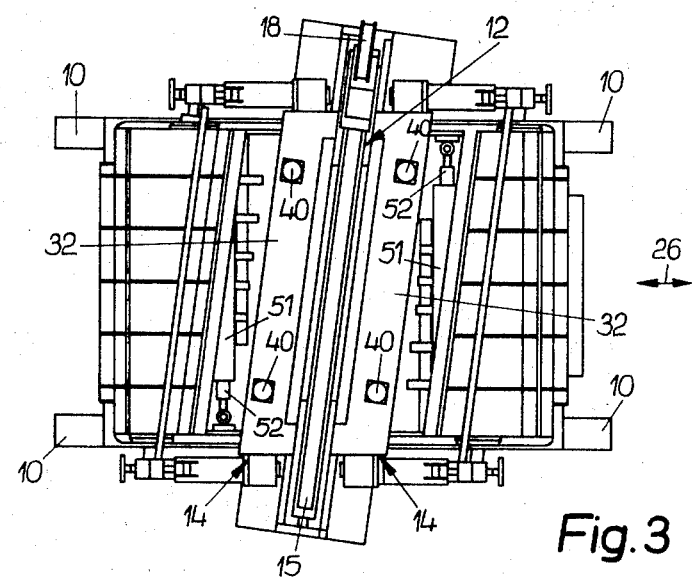

The upper side 17 of the upper beam 15 (FIG. 2) of the movable part of the separating device also serves for receiving the welding torch guidance as well as the feed means for the filler material used if necessary which are indicated in FIGS. 1 to 3 by a wire reel 18. The lower beam 19 of the shearing cutter holder shown in FIG. 4 and there is constructed at its inner side 20 as a welding base and for this purpose provided with a copper coating 21.

The shearing cutter holder 15 is activated pneumatically. For this purpose there is provided a pneumatic raising device 23 (FIGS. 1—2) below the equipment, lowered into a pit 22. In pit 22 a cart 25 is arranged on rails 24 for the removal of scrap sheet metal.

The direction of course of the bands to be welded is indicated in FIGS. 1 and 3 by an arrow 26. If the symmetrical construction of the equipment requires it, according to FIGS. 1 and 3 a conveyance of the paying out band is possible both from the left as well as from the right. The bands 27 and 28 are led into or out of the machine on rollers 29, 29.

Clamping jaw pairs 14 provide for the solid clamping of the band ends to be trimmed. FIGS. 1 to 3 illustrate the upper clamping jaws 32, while FIGS. 4 and 5 show the lower clamping jaws 33. As seen from FIG. 3, the separating devices 12, 13 as well as the clamping device 14 are arranged at a slant to the plane of band travel, and particularly at an angle of about 85°.

As shown in FIGS. 1—2 for the raising movement of the upper clamping jaws 32 there are provided pneumatically operated pistons 34 which are arranged movably in cylinders 35. Pistons 34 in this connection are hinged at point 36 at the upper clamping jaws 32, as the case may be, and the cylinders 35 are hinged at point 37 at the engine. Between cylinders 35 and pistons 34 are arranged cup spring packs 45 which in the relaxed condition of the cylinders serve for equalizing the weight of the upper clamping jaws In cylinders 38, movable, also pneumatically activated pistons 39 serve for the horizontal displacement of the clamping jaw pairs, which—as further explained in more detail below—is required after completed trimming of the band ends.

It is of course suitable to provide a common pressure medium system for the lifting activation of the upper clamping jaws 32 as well as for the horizontal movement of the clamping jaw pairs and for the lifting movement of the movable separating device 12. Furthermore, this pressure medium system is also employed for the cross adjustment of the clamping jaw pairs and particularly for the purpose of aligning the bands with each other, e.g. on their centers. Even in this connection movable pistons in cylinders are provided. In FIG. 3 these cylinders or pistons can be seen and are indicated as 51 and 52 respectively. By means of such a cross adjustment, a considerably more exact alignment of the bands against each other is possible than with the usual perpendicular rollers. Furthermore, by omission of the usual adjustment device, a considerable amount on overall length of the band-welding equipment can be saved.

As particularly demonstrated by FIGS. 4 and 5, on the upper clamping jaws 32 are arranged two cylinders 40 which are provided with pressure connections 41, 42. In the cylinders 40 a pneumatically activated piston 43 each which penetrates the upper clamping jaw 32 in a recess 44 and serves for the activation of the particular lower clamping jaw 33.

In FIGS. 6 to 10 the manner of operation of the novel band-welding equipment is explained in schematic form by way of the characteristic basic positions.

Figure 6:
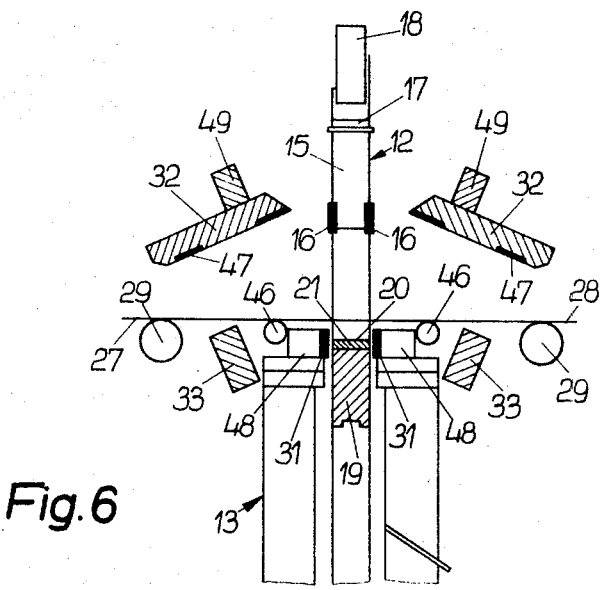

According to FIG. 6 the band-welding equipment is in band passage position, i.e. at this moment there is only one band in the machine which must pass through the machine up to its end. Coordinated guiding rollers 29, 46 are raised by means of the clamping jaw pairs 32, 33 to such an extent that band 27 can run along unhindered over the stationary shearing cutter 31. The clamping jaws 32, 33 are spread and simultaneously tilted, from which one can conclude that they are hinged at the engine.

Figure 7:
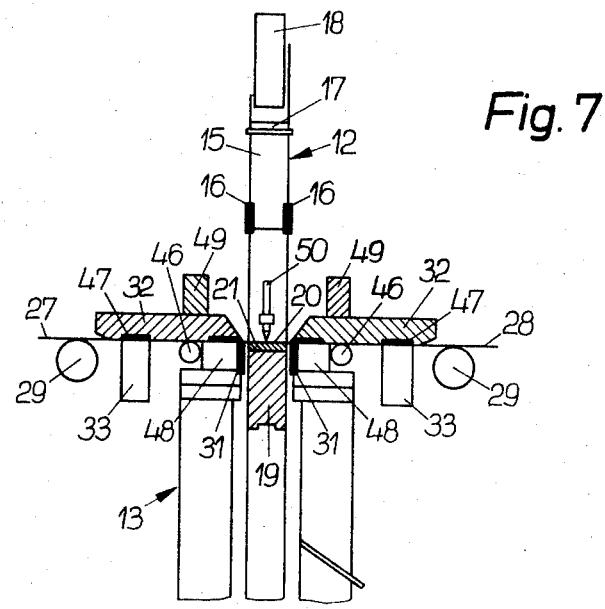

FIG. 7 shows the equipment immediately prior to the trimming of the band ends. The clamping jaw pairs, 32, 33 are closed and the bands 27, 28 are clamped in turn at two points: Once in reverse direction between the lower clamping jaw 33 and the upper clamping jaw 32, the latter of which is provided there for this purpose with a brake-lininglike synthetic material layer 47 with a high coefficient of friction. This is also very well recognizable in FIGS. 4 and 5. The second clamping point is at the front ends of the upper clamping jaw 32 forcing each other. The clamping in of the band ends takes place there between the upper clamping jaw 32 and the holding device 48 for the stationary shearing cutter 31. A reinforcing beam 49, attached in turn to the upper clamping jaw 32, serves for stabilizing the upper clamping jaw.

Figure 8:
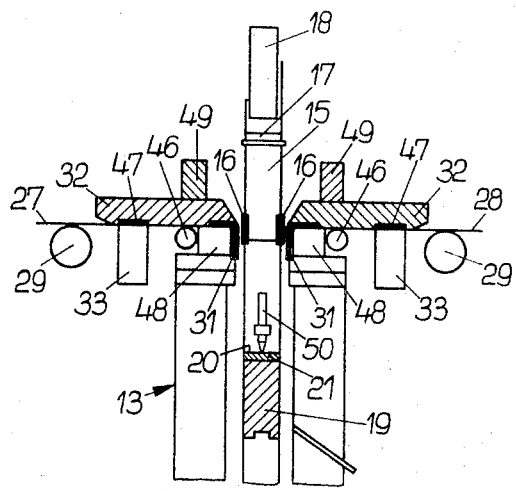
Figure 9:
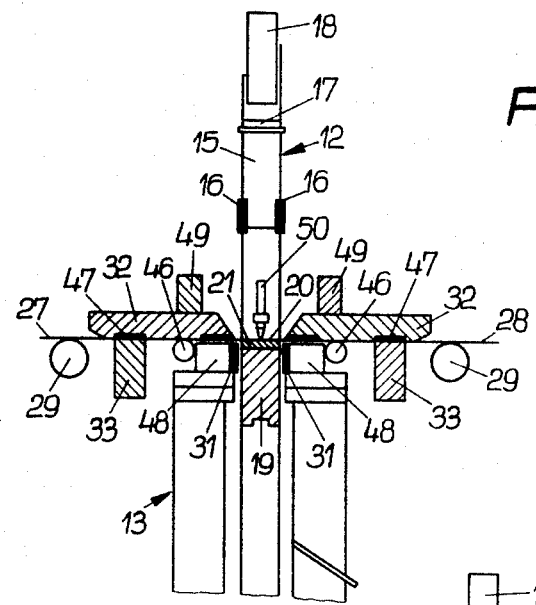
Figure 10:
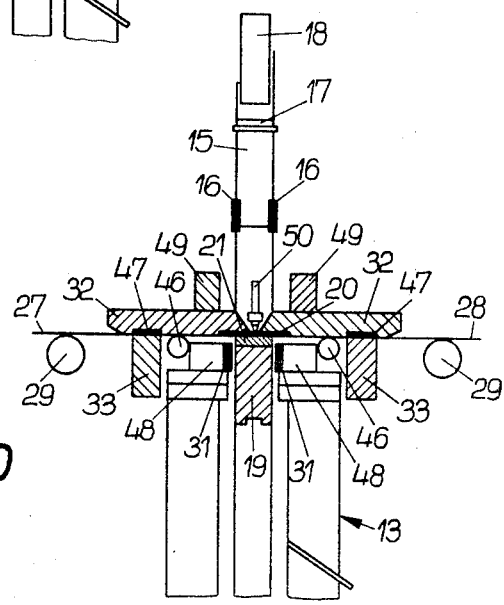

While in the basic position according to FIG. 7 the movable shearing cutters 16 are still arranged above the band plane, after the resultant trimming of the band ends, they are located now, according to FIG. 8, below the band plane, but—as FIG. 9 shows—immediately thereafter they are brought back into the old position (FIG. 7). Since the trimmed band ends now have a distance from each other which corresponds to that of the shearing cutter, for the subsequent welding process a leading together of both band ends is required. This occurs by a light lifting of the clamping jaw pairs 32, 33, whereby the rear clamping between jaws 32 and 33 remains, while the front clamping between jaw 32 and stationary holding device 48 is dissolved. Both clamping jaw pairs 32, 33 can now be conveyed in a horizontal course along with the band ends into the welding position, according to FIG. 10.

Subsequently there occurs again a clamping of the band ends at the front ends of the upper clamping jaws 32, this time however, from below through the welding base 21. As is particularly shown in FIG. 4, at the front edge of the upper clamping jaw there are provided for this purpose clamping jaw members 53, which are arranged side by side over the entire width of the upper clamping jaw and in turn have a width of about 300 mm. Between the clamping jaw members 53 and their support, the upper clamping jaw 32, there is arranged an intermediate layer 54 of round cross section passing through across the entire width of the clamping jaw. This intermediate layer 54 consists of an elastic material, preferably rubber, and has together with the clamping jaw parts 53 the task of evenly distributing the pressure exerted by the clamping jaws to the clamped band. Eventual thickness variations within a band or surface unevennesses can thereby be equalized.

Each clamping jaw part 53 is attached by means of a belt 55 and two nuts 56 at the upper clamping jaw 32. Furthermore, the clamping jaw parts have at their reverse ends spoutlike projections 57 which engage into correspondingly constructed recesses 58 in a rail 59, which rail is attached by means of screws 60 at the upper clamping jaw 32. This permits in not completely tightened nuts 56 a certain flexibility and resilience of the clamping jaw parts 53; consequently, with the coaction of the rubber layer 54, there is achieved an equalization of the width—or thickness variations or surface unevenesses of the clamped sheets of metal or bands.

The undersides of the clamping jaw parts 53 are furthermore coated with a copper layer 61 extending over the entire clamping jaws width. This copper layer fulfills the function of diverting whirlpools occurring in electric arc-welding and impairing the welding. The thickness of the copper layer 61 is determined in such a manner that the flexibility of the clamping jaw parts 53 is not impaired.

After the clamping in of the band ends between clamping jaw parts 53 and welding base 21, the welding can be undertaken by means of the welding torch indicated in FIGS. 7 to 10 and designated with 50.

What I claim is:

1. A device for welding band ends together comprising a frame having an upper crossbeam interconnected to a lower crossbeam, means for moving said frame vertically up and down, upper cutting means on said upper beam, complementary lower cutting means under said upper cutting means whereby the vertically downward movement of said frame causes said cutting means to effect a cutting operation to trim the adjacent ends of a pair of bands, means for moving the trimmed band ends together above said lower crossbeam into a welding area, said lower crossbeam including a bearing surface under said welding area whereby the vertically upward movement of said frame causes said upper cutting means to be moved away from the band ends and causes said bearing surface to be moved upward into contact with the band ends, and welding means mounted above said welding area for welding the band ends together.

2. In the device of claim 1 wherein said welding means is a movable welding torch suspended from said upper crossbeam.

3. In the device of claim 2 wherein said welding torch is suspended from the upper side of said upper crossbeam.

4. In the device of claim 3 including a pair of carrying members movably mounted on said upper side of said upper crossbeam and laterally clasping said torch whereby said torch is suspended from said upper crossbeam.

5. In the device of claim 4 wherein said torch is vertically adjustable.

6. In the device of claim 4 wherein said inner side of said lower cross beam includes means for clamping the band ends to the welded.

7. In the device of claim 1, wherein said inner side of said lower crossbeam includes means for clamping the band ends to be welded.

8. In the device of claim 1, wherein said upper cutting means include upper cutting shears connected to said upper crossbeam, said lower cutting shears vertically aligned with said upper cutting means being shears, roller means for conveying the bands to be welded, said roller means being movable between the plane of said lower cutting shears and a plane above said plane of said lower cutting shears, clamping means horizontally slidable from a band cutting to a band-welding position, and said bearing surface being between said lower shears and cooperating with said clamping means in said welding position.